United States Patent [19]
Savery et al.

[11] Patent Number: 6,085,097
[45] Date of Patent: Jul. 4, 2000

[54] CELLULAR COMMUNICATIONS TRACKING SYSTEM USING A MULTITUDE OF ASSIGNED CALL-NUMBERS

[76] Inventors: Winsor T. Savery, One Madison Ct., Manalapan, N.J. 07726; Ahmad Lamah, 387 Brookview Ct., Howell, N.J. 07731; Mohamad Ayoub, 72 Stonehurst Blvd., Freehold, N.J. 07728

[21] Appl. No.: 09/022,558

[22] Filed: Feb. 12, 1998

[51] Int. Cl.[7] .................................................. H04M 11/00
[52] U.S. Cl. ........................... 455/456; 455/457; 701/214
[58] Field of Search .................................... 455/445, 448, 455/456, 457, 461, 551, 552, 553, 435, 404, 422, 432; 701/213, 214; 707/10

[56] References Cited

U.S. PATENT DOCUMENTS

| | | | |
|---|---|---|---|
| 4,982,868 | 1/1991 | Shaffer et al. | 379/220 |
| 5,835,907 | 12/1995 | Newman | 707/10 |
| 5,890,068 | 10/1996 | Fattouche et al. | 455/456 |

Primary Examiner—Edward F. Urban
Assistant Examiner—Congvan Tran
Attorney, Agent, or Firm—Charles I. Brodsky

[57] ABSTRACT

A telephone network system for communicating location or status information concerning a mobile unit by cellular telephone coupled with the mobile unit in which sensed location or status information at any selected instant of time is converted to one of a multiple of coded, assigned telephone call-numbers uniquely identifying such information at that time, where the assigned call-number is transmitted over the network, and where the assigned call-number is received at a remote location, with the location or status information being extracted before any telephone call-connection from the mobile unit to the remote location is completed. The coded, assigned telephone call-numbers are reserved by the system operator from the telephone company serving the area of the remote location, and extracting the location or status information before any telephone call-connection is completed saves the costs to an end user of the mobile unit associated with a conventional telephone call-connection.

28 Claims, 4 Drawing Sheets

CELLULAR COMMUNICATIONS TRACKING SYSTEM USING A MULTITUDE OF ASSIGNED CALL-NUMBERS

FIELD OF THE INVENTION

This invention relates to telephone network systems communicating with a remote location by means of a cellular transceiver in a mobile unit. More particularly, the invention relates to the communication of information concerning the location or status of that mobile unit.

BACKGROUND OF THE INVENTION

Telephone network systems communicating location or status information concerning monitored mobile items—such as people, vehicles, cargo containers, barges and the like—have been described in the art. Typical of those systems is that described in U.S. Pat. No. 5,544,225 (Kennedy et als), for use with location information obtainable from configurations as diverse as global positioning satellite (GPS) systems, inertial navigation systems, dead reckoning systems, etc. Characteristic of these arrangements is the receiving of the information at a central location, remote from the mobile item of interest, as a completion of a telephone call-connection by which either voice or data message content is transmitted.

As will be appreciated, such connection entails a telephone company communication charge, now the order of 61¢ per minute and more, with the cost being rounded to the next higher minute—so that a one-minute charge, for example, is levied for even as little as a 1-second data burst. As will also be understood, such communication costs become expensive as more and more transmissions take place between that mobile item and the central location, and then multiplied by the number of all the mobile items being monitored. Thus, for a fleet of interstate trucks, for example, communicating their whereabouts, their speed, their destination, etc., such charges could escalate quite quickly—even if the telephone company communication fees remain unchanged.

OBJECTS OF THE INVENTION

It is an object of the present invention, therefore, to provide a new and improved telephone network system of this type which could serve to reduce these data transmission costs.

It is an object of the invention, also, to provide such a telephone network system operative to keep such data transmission costs minimally low.

It is another object of the invention to provide a telephone network system communicating with a remote location in these manners, by which the cost to an end user for obtaining reports of these informations from the system operator could be contracted for beforehand, regardless of the number of transmissions between the mobile unit and the remote location, and vice-versa.

It is a further object of the invention to provide such a telephone network system in which the cost to the end user can be at a relatively low amount, regardless of the distance between the remote location of the system operator and the mobile unit, independent of where, in the world, that remote location and that mobile unit may be.

It is a still further object of the invention to provide a telephone network system of this type without having to re-design and develop new existing apparatus and methods of operation, in order to keep low the expense involved in implementing the telephone network system and in having it operational.

SUMMARY OF THE INVENTION

As will become clear from the following description, these objects are attained according to the teachings of the invention through the marriage of technologies presently available in global positioning satellite systems, telecommunications systems, and computer switching and display apparatus. With present-day GPS systems, for example, locations of objects can be accurately determined within a few feet. Utilizing such systems, according to the invention, can serve to establish a longitude, a latitude, and a speed of a monitored mobile item, such as the moving interstate transport noted above, and for monitoring such information remotely and quite easily.

Recent advances in the telecommunications industry have led to the development of "caller ID", by which an automatic number identification (ANI) can be captured from a calling telephone number before the call is answered, and even if it is not answered. Such telecommunications advances also include the development of "callback", which captures the called telephone number ("direct inward dialing"), again before the called phone answers, and even where it does not answer. As will be seen, the telephone network system of the present invention utilizes aspects of these two services, along with the added feature of reserving from the telephone company, for a monthly fee, area code, exchange and prefix numbers that have not yet been assigned.

Recent developments in computer technology have allowed for the implementation of high speed switching networks, along with the availability of conventional map software in displaying geographical areas on a computer monitor, and pinpointing the location there of a site of interest.

Thus, a telephone network system embodying the invention includes first means at an end user's mobile unit for converting location or status information obtained from a GPS system, as an illustration, at any selected instant of time, and for converting that information to one of a multitude of assigned telephone call-numbers uniquely identifying that information at that time. Such telephone network system also includes means, coupled with the mobile unit, for transmitting such assigned call-numbers over the telephone network utilizing a cellular transceiver, in conventional manner.

This preferred telephone network system of the invention then also includes means, at the remote location of the system operator, for receiving the assigned call-numbers, and to extract from it the location or status information. Utilizing the "caller ID" and the computer switching and map software schemes available, the location or status information is extracted and displayed before any telephone call-connection is completed, and without the need to complete that telephone call-connection.

As will be seen from the following description, whether the communication be from the end user's mobile unit to the system operator's remote location, or whether it be from the remote location to the mobile unit, an "on-hook" system is provided to communicate the information, rather than the previous "off-hook" configuration which characterized the prior art in communicating its voice or data information as a completed call. Since the information is extracted without the need for answering the telephone call in this manner, no usage charges result, no matter how many calls there were, or at what time of day they were made. Similarly, since no telephone calls were completed, no charges for telephone call-connections result, no matter where in the world the mobile unit and/or the remote location may be situated.

Once the global positioning system, for example, is operational, once the cellular transceivers are in place aboard the mobile unit and operative with the GPS apparatus, and once the computer switching and display software are installed, substantially the only cost to the operator of the system would be a monthly charge by the telephone company for each direct inward dialing (DID) line reserved—now, $1.00 per DID. When reserving ten thousand numbers of given area code and exchange (as with the telephone network system described), the cost would then amount to $10,000.00 per month, regardless of the number or frequency of these various communications. The only cost to the end user would then be that contracted for with the operator of the system—on a monthly basis, for example—for obtaining information reports concerning the operation of its mobile units (e.g. $A dollars per month, $B per report).

In addition to the present invention's advancement of a telephone network system communicating to a remote location such sensed location or status information concerning a mobile unit by means of a cellular transceiver coupled with the mobile unit, the teachings of the present invention will also be understood to cover a method for communicating this information, again before any telephone call-connection is completed and the telephone call answered.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
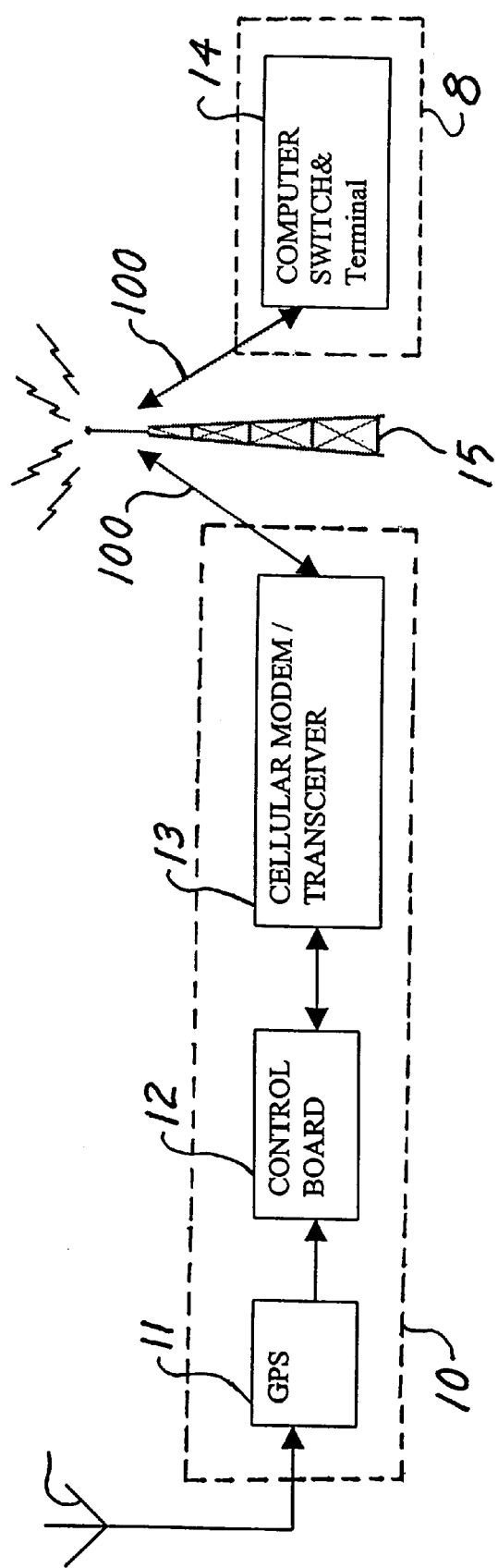
FIG. 1 schematically illustrates a typical telephone network system communicating with a remote location by means of a cellular transceiver in a mobile unit, in connection with which the teachings of the present invention finds great usefulness.

FIG. 1 illustrates a system of using a satellite-linked GPS Global Positioning System with proprietary software to trace vehicles, for example, anywhere in the world using maps on computers that display the exact location of the vehicle, and without cellular or transmission cost. Thus, in FIG. 1, at the mobile unit vehicle 10 of an end user, a GPS system 11 captures the longitude and latitude information from a satellite (not shown) by means of an antenna 9. A control board 12 converts such longitude and latitude information— as well as any other information that may be received from the satellite—to one of a multiple of assigned telephone call-numbers (i.e., code numbers in telephone number format) uniquely identifying that information at any selected instant of time, in a manner to be described. A cellular data/voice modem and transceiver 13 sends the coded call-number information by cellular network (represented by the tower 15), to the central or remote location 8 of the system operator, where a computer switch and terminal 14 is located. As indicated by the arrow notations 100, such communication can be from the mobile unit 10 to the remote location 8, or from the remote location 8 to the mobile unit 10. As will be understood by those skilled in the art, the antenna 9, the GPS system 11, the cellular modem/transceiver 13 and the computer switch and terminal 14 may be of any available design or configuration.

In accordance with the invention, certain telephone numbers are reserved and allocated solely for use in the tracking system. Such telephone numbers may be designated by a ten digit number of area code, exchange and prefix—as:

Y1Y2Y3 - X1X2X3 - Z1Z2Z3Z4 where each of Y1, Y2, Y3 are whole numbers from 1 to 9, and where each of the numbers X1, X2, X3, Z1, Z2, Z3, and Z4 are whole numbers from 0 to 9. Further in accordance with the invention, the X1, X2, X3 exchange may be obtained from the local telephone company as an exchange not yet assigned in the area code serving the remote location. The prefix Z1, Z2, Z3, Z4 represents any one of ten thousand available numbers in such area code and exchange available for reservation by the system operator from the telephone company, at a monthly charge of presently $1.00 per number each month—for a total of $10,000.00 per month for the prefixes 0000 through 9999.

In the operation of the system of FIG. 1, the control board 12 captures the sensed location or status information of the mobile unit vehicle from the GPS system 11, and converts it into a sequence of these ten digits, as a direct inward dialing, called phone number (DID), along with an automatic number identification (ANI) identifying the sending unit. For example, with a longitude of 115 degrees, 25 minutes, 3671 seconds, and with a latitude of 36 degrees, 52 minutes, 1431 seconds, a data conversion and transmission according to the invention might be as follows (assuming an area code of 732, and with a reserved exchange 461 for the central location):

a. Starting with longitude, the control board 12 converts the information from the GPS system 11 to the telephone number 732-461-1152. The cellular modem/transceiver 13 transmits the call-number 732-461-1152 via the tower 15 to the remote location 8 where the computer 14 switch captures the number. In accordance with the programming at the computer, the first six digits are stripped, and the last four digits kept, which, in accordance with the example, are the first four digits of the longitude 1152. Next, the cellular modem/transceiver 13 transmits a second call-number 732-461-5367 to the remote location 8, where the computer switch 14 captures the number a second time—similarly stripping the first six digits and keeping the last four digits 5367 as the last four digits of the longitude. The switch then stores the eight digits 11525367 as the longitude 115 degrees, 25 minutes, 367 seconds, which is accurate to within 10 feet.

b. The same procedure—as with "caller ID"—is then followed, in transmitting the latitude information to the remote location, again before any telephone call-connection is completed and without having to pay for any telephone call charge. Here, the cellular modem/transceiver 13 transmits 732-461-3652, where the computer switch 14 captures it and once more strips the first six digits and keeps the last four digits, 3652. Then, the cellular modem/transceiver 13 transmits the second sequence, 732-461-1431, to be captured by the computer switch 14, stripping the first six digits and keeping the last four digits 1431. The information then stored is the latitude 36 degrees, 52 minutes, 1431 seconds, taken to eight digits, accurate to within 10 feet as before.

With both the longitude and the latitude stored at the remote location 8, the location of the vehicle can be displayed on the computer terminal to within 10 foot accuracy, when using conventional map software such as Delorme, map expert.

Where the global positioning system 11 provides such other additional information as the speed of the mobile unit, as for example 70 mph, control board 12 operates to convert such information to 732-461-7000, to be transmitted by the cellular modem/transceiver 13, to be captured by the computer switch 14, where only the last four digits are again utilized.

Where the communication of the time of transmission is of concern, then the cellular modem/transceiver 13 converts the time to transmit 732-461-1645, to designate the transmission of longitude, latitude and speed to be at 4:45 p.m., with the computer switch 14 once again stripping the six area code and exchange digits from the captured coded call-number identification.

With each of these arrangements, the computer switch 14 at the remote location 8 captures both the automatic number identification of the sending transceiver at the mobile unit, and the direct inward dialing of the code-number called, before any telephone call-connection is completed. As a result, no charges accrue for the transmission, and the only cost involved is the monthly reservation charge of the telephone company for each line reserved—$1.00 per line per month at the present time.

Figure 3:
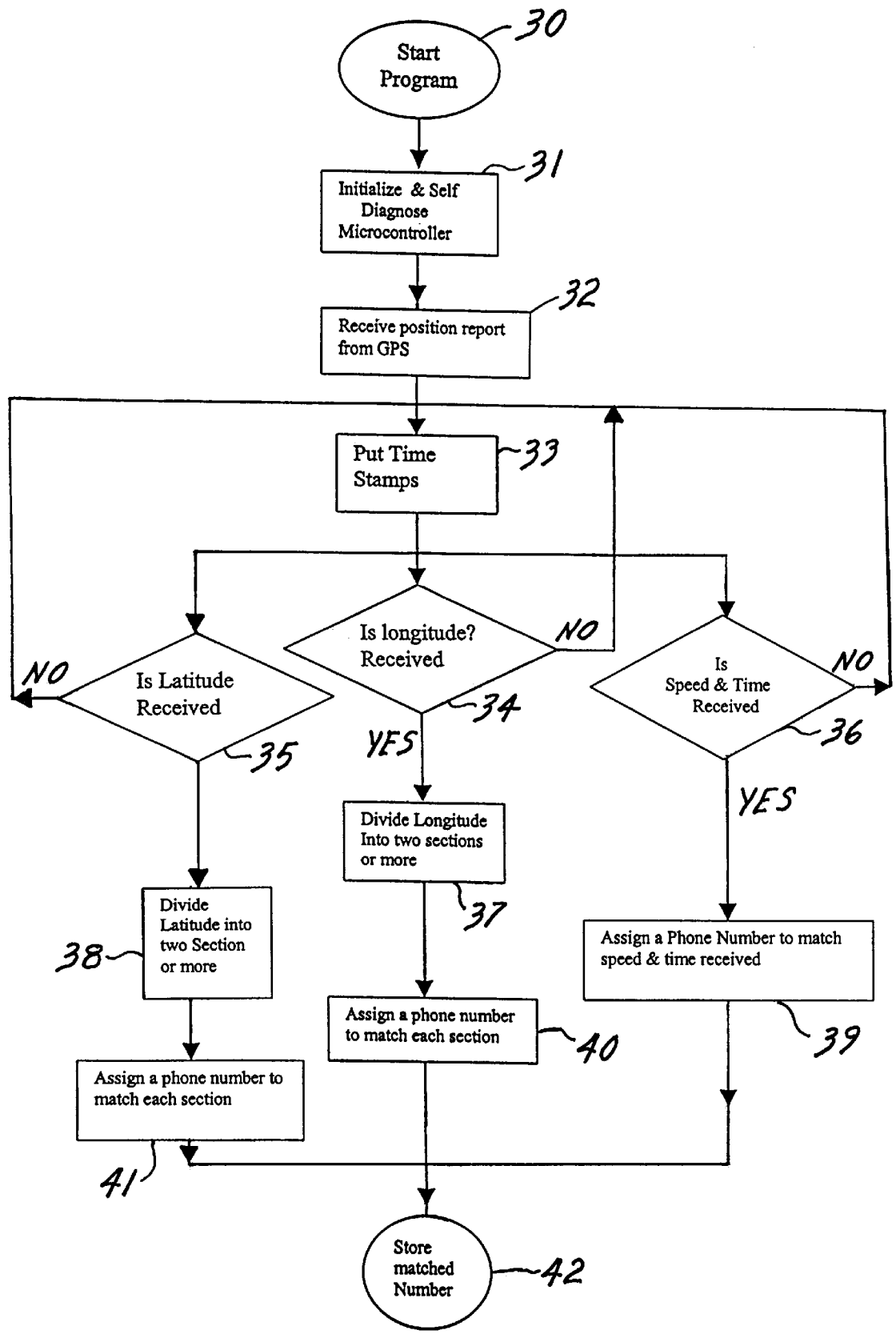
FIG. 3 is a flow diagram helpful in an understanding of the operation at the mobile unit in transmitting assigned telephone call-numbers uniquely identifying sensed location or status information at any selected instant of time.

Referring to the flow diagram of FIG. 3 for the mobile unit 10, the computer program is started at 30, the microprocessor controller 31 initializes and internally diagnoses the program for operating the control board 12, and the location or status information is received at 32 from the GPS unit 11. A time stamp is inserted at 33 from an on-board clock, until such time as a transmission by the cellular modem/transceiver 13 is to be made to the remote location. Block 34 analyzes the received information from the global positioning system satellite, and where longitude information is received, divides it into two or more components of four digits each in unit 37, as the assigned coded telephone call-number to be added to the area code and exchange digits in uniquely identifying the longitude information. After analysis, the unit 40 sends such number to be transmitted to the cellular modem/transceiver 13, and also stores it at block 42.

Similarly, block 35 looks to see the receipt of latitude information from the global positioning system, divides it into two or more components of four digits each in block 38 as the assigned coded telephone call-number to be added to the area code and exchange digits in uniquely identifying the latitude information for transmission. Each of the blocks 37, 38 divide the longitude and latitude information respectively into two or more components, to allow the transmission of the four digits each along with the area code and exchange digits in accurately conveying to within ten feet the longitude and latitude positions measured in degrees, minutes and seconds.

Block 36 investigates to determine the receipt of speed information from the GPS system, and assigns a telephone call-number to it in unit 39, identifying the speed of the vehicle, for transmission by the cellular modem/transceiver 13. As with a sending of a coded telephone call-number identifying the time of transmission, no dividing of the information into two sections is required as a complete definition of speed in miles per hour, and time in military numbers, can be fully communicated in only the last four digit prefixes of the telephone call-number assigned. Where the units 34, 35, and 36 do not receive any GPS information, the flow diagram indicates their remaining in ALERT condition, awaiting receipt of such information. Each coded telephone call-number assigned for transmission is stored in the buffer 42.

The flow diagram of FIG. 3 in one manner of operation, continues to transmit its assigned telephone call-number representing longitude, latitude, speed and time at intervals established in the microcontroller 31. Occasions may arise, however, where the transmission of such call-number information would be desirable to be upon command from the remote location. Thus, upon receipt along tower 15 and cellular modem/transceiver 13 of a call-number to activate the circuitry of control board 12, that received signal initiates the conversion of the GPS information and its transmission back to the remote location for display. In such instance, the transmission of the sensed location or status information would be upon command, instead of at preprogrammed intervals of every 30 minutes or so. Alternatively, the command from the remote location could be one to change-over the interval spacing between transmissions from every 30 minutes to every 15 minutes, for example.

Figure 4:
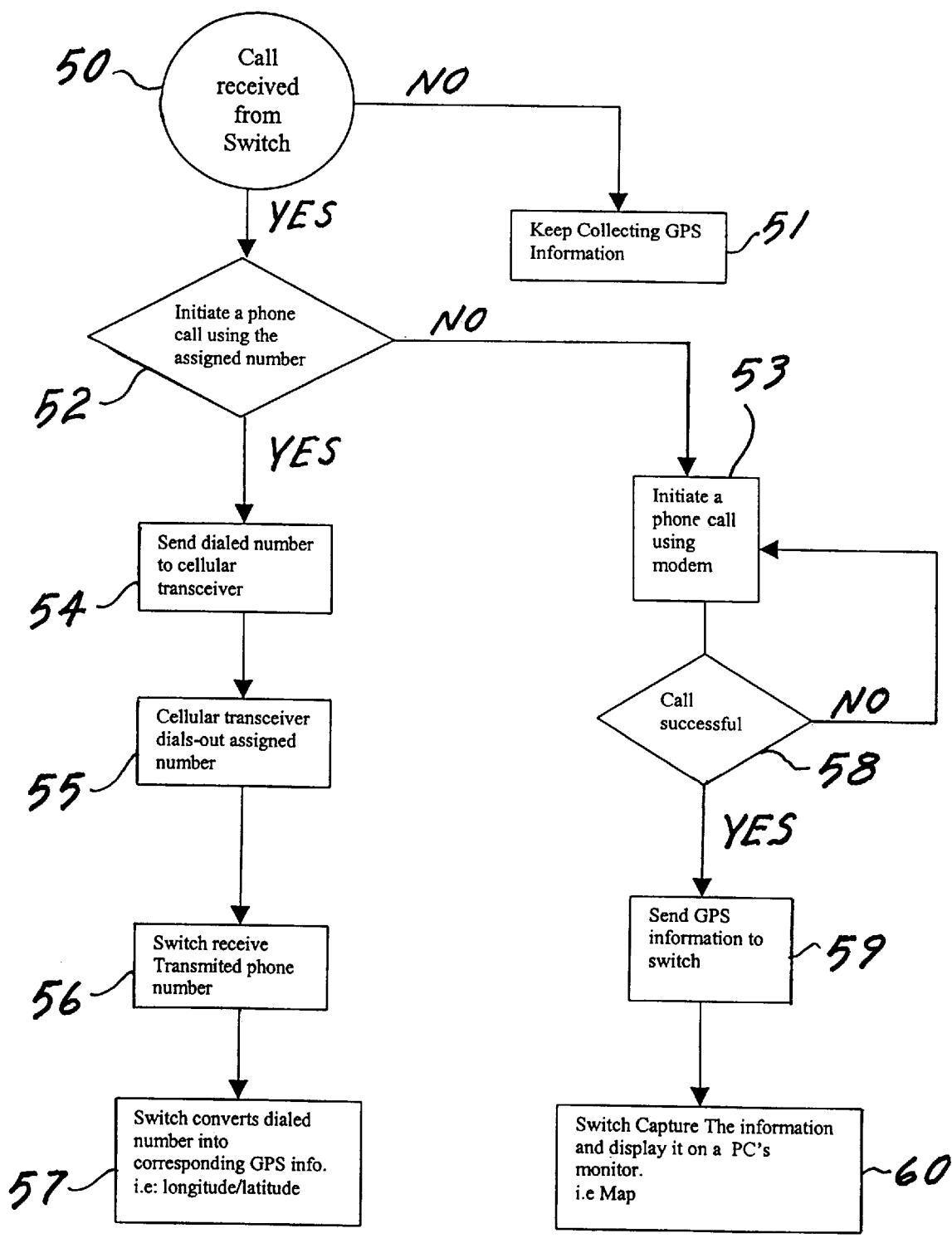
FIG. 4 is a flow diagram also helpful in an understanding of the operation at the remote location in transmitting sensed location or status information upon demand from the remote location.

In the flow diagram of FIG. 4, the command signal received from the remote or central location is indicated at 50, the conversion of the GPS information to an assigned number occurs at 52, its sending to the cellular modem/transceiver 13 is shown at 54, its transmitting of the assigned number is indicated at 55 through the tower 15, and the receipt of that transmitted signal is shown at the remote location 8 at 56, where it is converted back into the longitude/latitude, speed and time information, as at 57, for display on the computer monitor and map.

In the event of a failure mode of operation which prevents the coded telephone call-numbers from being transmitted through the cellular modem/transceiver 13, a transmission can be had directly by means of a separate modem 53 at the mobile unit, which when successful, transmits the assigned number information directly to the remote location where it is captured for display on the monitor, as in units 58, 59 and 60 of FIG. 4. In the absence of a control signal command requesting this information from the remote location 8, the control board 12 of the mobile unit continues to collect the global positioning information, as illustrated at 51. In either event, the automatic number identification (ANI) continues to be sent to identify the calling-number, with the direct inward dialing (DID) continuing to call the assigned reserved prefix and exchange at the remote location in communicating its location or status information. In both such instances, where the global positioning information is transmitted automatically or upon command from the remote or central location, the transmittal continues as data message bursts conveying the desired information in a manner to be captured and thereafter displayed, before any telephone call-connection is completed, thereby continuing the described "on-hook" sequence of events.

Figure 2:
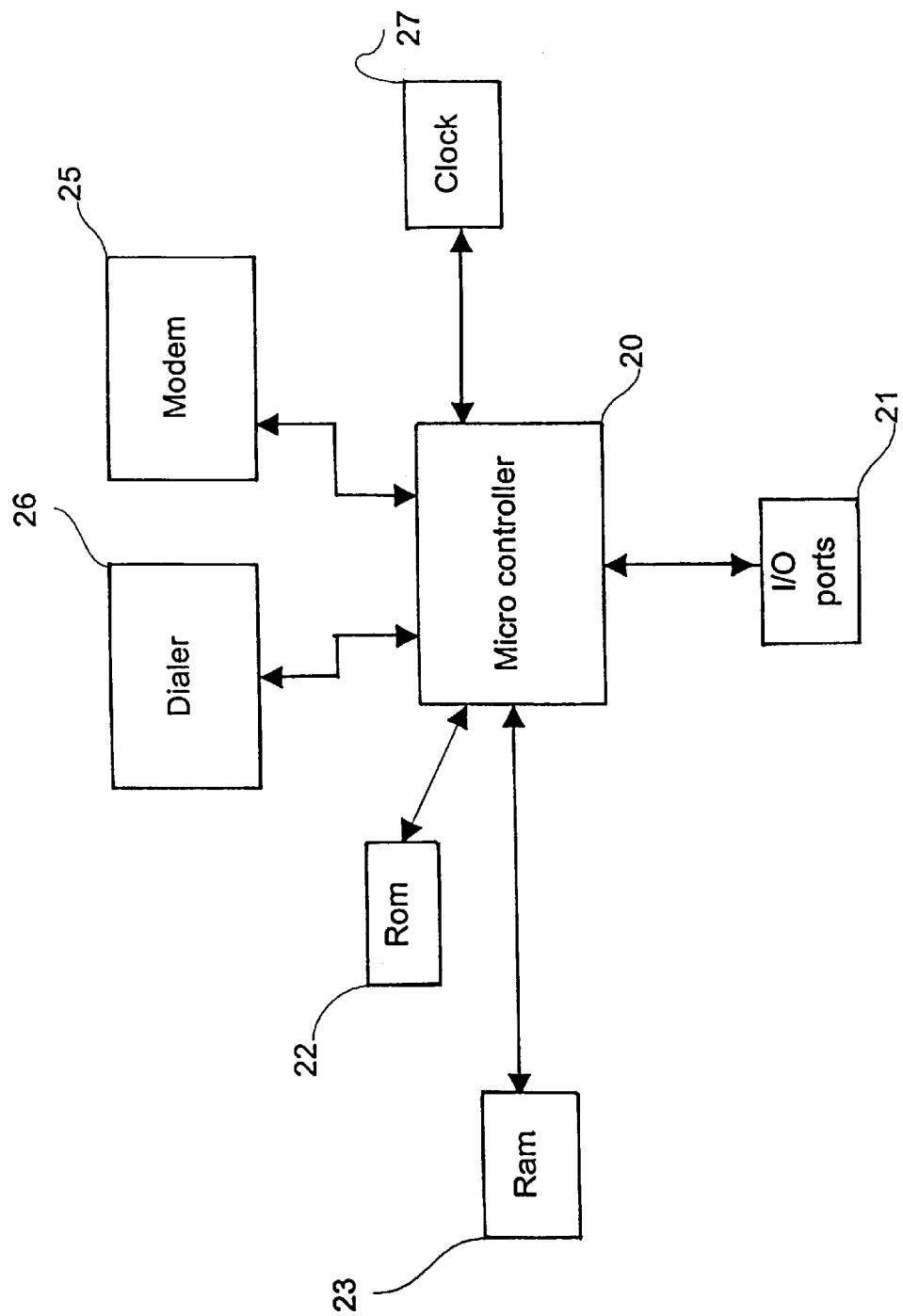
FIG. 2 is a block diagram helpful in an understanding of the transmission of location or status information to the remote location from the mobile unit.

FIG. 2 illustrates the microcompressor of the control board 12, in which a clock 27 governs the timing, wherein the cellular modem/transceiver is controlled at 25, and wherein the alternative dialer for use is shown at 26. The microcontroller 20 is governed by a random access memory (RAM) 22 in which the location and status information is stored. A read only memory (ROM) 22, independently stores the program for operating the controller, while the clock 27 creates various time stamps to be placed on information as received from the GPS system. The dialer 26, in conventional manner, may also generate the audio tones corresponding to the telephone number dialed.

In this manner, the GPS signal from the satellite containing information about longitude, latitude, speed and time, for example, of the mobile unit is passed to the controller where it is processed, saved, and converted into a coded, assigned telephone number format. The controller sends this format to the cellular transceiver where the call-number is transmitted out over the cellular network to be received at the remote location by a telecommunication switch where the call-number is converted back into longitude, latitude, speed and time and displayed on a map using computer software showing the exact location of the vehicle, as on a world map. In all these transmissions, it will be appreciated, that the information is captured by the telecommunications switch at the remote location of the system operator with the reserved 10,000 prefixes, all before a telephone call-connection is completed, as with "caller ID". Of course, where less specific information is desired for the end user, the system operator requires fewer of these prefixes from the telephone company, and pays a lesser monthly reservation charge as a result.

While there has been described what is considered to be a preferred embodiment of the present invention, it will be appreciated by those skilled in the art that modifications can be made without departing from the scope of the teachings herein of sending these coded telephone-formatted signals from a moving vehicle computer to a stationary computer at the remote central location by a cellular phone transmission which conveys its information before any telephone call-connection has been completed. Thus, whereas the telephone network system has been described in the context of first transmitting sensed longitude, then latitude, speed and time information to the remote location, the order of transmission may be reversed, or altered in any desired manner. In this manner, an end user of a first, intrastate trucking company, for example, could have its vehicles communicate with the system operator's remote, central location and pay a monthly fee based on the number of reports provided, an end user of a second, interstate trucking company could do the same and pay a flat monthly fee independent of the number of reports provided, and an end user of a third, global trucking company could act similarly and pay a base monthly fee and an overage once the number of reports exceed a predetermined amount, Arrangements like these will be understood to be within the principles of the invention—and, for at least such reason, therefore, resort should be had to the claims appended hereto for a true understanding of the scope of the invention.

We claim:

1. In a telephone network system communicating to a remote location sensed location or status information concerning a mobile unit by a cellular transceiver coupled with the mobile unit, the improvement comprising:

first means for converting said sensed location or status information at any selected instant of time to one of a multitude of assigned telephone call-numbers uniquely identifying said information at said time, and for transmitting said assigned call-numbers over said network; and second means for receiving said assigned call-numbers and to extract therefrom said location or status information;

with said second means extracting said location or status information before any telephone call-connection from said first means to said second means is completed.

2. The improvement of claim 1 wherein said first means converts said sensed location or status information to an assigned telephone call-number of given area code and exchange, and of a prefix uniquely identifying said information.

3. The improvement of claim 1 wherein said first means converts said sensed location or status information to an assigned telephone call-number of given area code and exchange, and of a prefix of ten thousand numbers, 0000 through 9999, uniquely identifying said information.

4. The improvement of claim 1 wherein said first means converts said sensed information to an assigned telephone call-number identifying the longitude of said mobile unit at said selected instant of time.

5. The improvement of claim 4 wherein said first means converts said sensed information to an assigned telephone call-number of given area code and exchange, and of a single prefix from ten thousand numbers, 0000 through 9999, uniquely identifying said longitude at said selected time.

6. The improvement of claim 1 wherein said first means converts said sensed information to an assigned telephone call-number identifying the latitude of said mobile unit at said selected instant of time.

7. The improvement of claim 6 wherein said first means converts said sensed information to an assigned telephone call-number of given area code and exchange, and of a single prefix from ten thousand numbers, 0000 through 9999, uniquely identifying said latitude at said selected time.

8. The improvement of claim 1 wherein said first means converts said sensed information to an assigned telephone call-number identifying the speed of said mobile unit at said selected instant of time.

9. The improvement of claim 8 wherein said first means converts said sensed information to an assigned telephone call-number of given area code and exchange, and of a single prefix from ten thousand numbers, 0000 through 9999, uniquely identifying said speed at said selected time.

10. The improvement of claim 1 wherein said first means converts said sensed information to an assigned telephone call-number identifying the time at which said transmission is made.

11. The improvement of claim 10 wherein said first means converts said sensed information to an assigned telephone call-number of given area code and exchange, and of a single prefix from ten thousand numbers, 0000 through 9999, uniquely identifying said time of transmission.

12. The improvement of claim 1 wherein said first means also includes means for automatically transmitting a call-number over said network identifying that mobile unit communicating with said remote location at said given instant of time.

13. The improvement of claim 1 wherein said second means also includes means for transmitting command signals over said network to control the transmitting of said call-numbers, and wherein said first means includes means for receiving said command signals and for extracting the information therefrom before any telephone call-connection from said second means to said first means is completed.

14. The improvement of claim 1 for use in a telephone network system to communicate sensed location or status information concerning a moving vehicle situated anywhere in the world.

15. The improvement of claim 1 for use in a telephone network system utilizing global positioning for sensing location or status information of a moving vehicle.

16. A method for communicating location or status information concerning a mobile unit by a cellular telephone network including a cellular transceiver coupled with the mobile unit, comprising the steps of:

receiving the location or status information of the mobile unit at said unit;

converting said received information at any selected instant of time to one of a multiple of assigned telephone call-numbers uniquely identifying said information at said time;

transmitting said assigned call-numbers over said network; and receiving said assigned call-numbers and for extracting the information therefrom to obtain said location or status information before any telephone call-connection is completed.

17. The method of claim 16 wherein said converting step converts said location or status information to an assigned telephone call-number of given area code and exchange, and of a prefix uniquely identifying said information.

18. The method of claim 16 wherein said converting step converts said location or status information to an assigned telephone call-number of given area code and exchange, and of a prefix of ten thousand numbers, 0000 through 9999, uniquely identifying said information.

19. The method of claim 16 wherein said converting step converts said information to an assigned telephone call-number identifying the longitude of said mobile unit at said selected instant of time.

20. The method of claim 19 wherein said converting step converts said sensed information to an assigned telephone call-number of given area code and exchange, and of a single prefix from ten thousand numbers, 0000 through 9999, uniquely identifying said longitude at said selected time.

21. The method of claim 16 wherein said converting step converts said information to an assigned telephone call-number identifying the latitude of said mobile unit at said selected instant of time.

22. The method of claim 21 wherein said converting step converts said sensed information to an assigned telephone call-number of given area code and exchange, and of a single prefix from ten thousand numbers, 0000 through 9999, uniquely identifying said latitude at said selected time.

23. The method of claim 16 wherein said converting step converts said information to an assigned telephone call-number identifying the speed of said mobile unit at said selected instant of time.

24. The improvement of claim 23 wherein said converting step converts said sensed information to an assigned telephone call-number of given area code and exchange, and of a single prefix from ten thousand numbers, 0000 through 9999, uniquely identifying said speed at said selected time.

25. The method of claim 16 wherein said converting step converts said information to an assigned telephone call-number identifying the time of transmission of said mobile unit at said selected instant of time.

26. The method of claim 25 wherein said converting step converts said sensed information to an assigned telephone call-number of given area code and exchange, and of a single prefix from ten thousand numbers, 0000 through 9999, uniquely identifying said time of transmission.

27. The method of claim 16 also including the step of automatically transmitting a call-number over said network identifying that mobile unit transmitting said location or status information at said selected instant of time.

28. The method of claim 27 wherein said converting step converts said sensed information to an assigned telephone call-number of given area code and exchange, and of prefix less than ten thousand, uniquely identifying said location or status information at said selected instant of time.

* * * * *